US012211343B2

(12) United States Patent
Medford et al.

(10) Patent No.: US 12,211,343 B2
(45) Date of Patent: *Jan. 28, 2025

(54) GAMING MACHINE AND METHOD WITH NUMERICAL BASIS FOR PRIZES IN REELS

(71) Applicant: Everi Games Inc., Austin, TX (US)

(72) Inventors: Charles A. Medford, Jarrell, TX (US); Daniel W. Eulenfeld, Round Rock, TX (US)

(73) Assignee: Everi Games, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/581,237

(22) Filed: Feb. 19, 2024

(65) Prior Publication Data

US 2024/0194018 A1 Jun. 13, 2024

Related U.S. Application Data

(63) Continuation of application No. 17/985,865, filed on Nov. 13, 2022, now Pat. No. 11,928,917, which is a continuation of application No. 17/197,436, filed on Mar. 10, 2021, now Pat. No. 11,501,602, which is a continuation of application No. 16/265,010, filed on Feb. 1, 2019, now Pat. No. 10,950,083.

(51) Int. Cl.
*G07F 17/32* (2006.01)
*G07F 17/34* (2006.01)

(52) U.S. Cl.
CPC ...... *G07F 17/3213* (2013.01); *G07F 17/3209* (2013.01); *G07F 17/3258* (2013.01); *G07F 17/3267* (2013.01); *G07F 17/34* (2013.01)

(58) Field of Classification Search
CPC ............ G07F 17/3213; G07F 17/3209; G07F 17/3258; G07F 17/3267; G07F 17/34
See application file for complete search history.

(56) References Cited

U.S. PATENT DOCUMENTS

| | | | |
|---|---|---|---|
| 2,743,108 | A | 4/1956 | Sanders |
| 4,695,053 | A | 9/1987 | Vazquez, Jr. et al. |
| 4,721,307 | A | 1/1988 | Okada |
| 4,836,546 | A | 6/1989 | DiRe et al. |
| 5,205,555 | A | 4/1993 | Hamano |
| 5,580,053 | A | 12/1996 | Crouch |
| 6,015,346 | A | 1/2000 | Bennett |
| 6,102,798 | A | 8/2000 | Bennett |
| 6,142,873 | A | 11/2000 | Weiss et al. |
| 6,155,925 | A | 12/2000 | Giobbi |
| 6,174,234 | B1 | 1/2001 | Seibert |
| 6,174,235 | B1 | 1/2001 | Walker |
| 6,217,022 | B1 | 4/2001 | Astaneha |

(Continued)

*Primary Examiner* — Kevin Y Kim

(74) *Attorney, Agent, or Firm* — Calvert Technology Law, PLLC; Nathan H. Calvert

(57) ABSTRACT

A gaming machine and method for operating a slot machine game in which virtual or mechanical reels include numbers from which a prize amount is produced by concatenation. In response to a wager activation by a player, the reels display conduct a base game including spinning the reels and stopping to produce a respective randomly selected outcome having a plurality of symbols including single digit numbers which are positive numbers and zero, double digit numbers which are positive and double zero, and blank symbols. A prize amount associated with the outcome is identified by concatenating the single and double digit numbers along a designated payline.

19 Claims, 8 Drawing Sheets

(56) References Cited

U.S. PATENT DOCUMENTS 6,231,442 B1 5/2001 Mayeroff
6,251,013 B1 6/2001 Bennett
6,261,178 B1 7/2001 Bennett
6,312,334 B1 11/2001 Yoseloff
6,319,124 B1 11/2001 Baerlocher
6,328,649 B1 12/2001 Randall
6,358,147 B1 3/2002 Jaffe
6,398,218 B1 6/2002 Vancura
6,413,161 B1 7/2002 Baerlocher
6,604,999 B2 8/2003 Ainsworth
6,641,477 B1 11/2003 Dietz
6,672,960 B1 1/2004 B-Jensen
6,688,977 B1 2/2004 Baerlocher
6,733,385 B1 5/2004 Enzminger et al.
6,875,108 B1 4/2005 Hughs-Baird
6,910,962 B2 6/2005 Marks et al.
7,192,347 B1 3/2007 Marks et al.
7,357,713 B2 4/2008 Marks et al.
7,377,849 B2 5/2008 Baerlocher
7,476,155 B2 1/2009 Lind et al.
7,686,686 B2 3/2010 Marks et al.
7,766,741 B2 8/2010 Lind et al.
8,083,581 B2 12/2011 Marks et al.
8,087,990 B2 1/2012 Lind et al.
8,187,080 B2 5/2012 Sims
8,216,050 B2 7/2012 Lind et al.
8,235,787 B2 8/2012 Lind et al.
9,251,667 B2 2/2016 Marks et al.
9,542,808 B2 1/2017 Marks et al.
10,115,272 B2 10/2018 Marks et al.
10,255,752 B2 4/2019 Singer et al.
10,417,870 B2 9/2019 Marks et al.
10,699,515 B2 6/2020 Singer et al.
10,699,516 B2 6/2020 Singer et al.
2002/0022509 A1 2/2002 Nicastro
2002/0187827 A1 12/2002 Blankstein
2003/0036422 A1 2/2003 Baerlocher
2003/0134677 A1 7/2003 Obied
2006/0046833 A1 3/2006 Hatakeyama
2009/0124338 A1 5/2009 Watkins et al.
2009/0233692 A1 9/2009 Yoshizawa
2010/0016059 A1 1/2010 Sims
2011/0006477 A1 1/2011 Miller
2017/0024958 A1 1/2017 Singer

GAMING MACHINE AND METHOD WITH NUMERICAL BASIS FOR PRIZES IN REELS

CROSS REFERENCE TO RELATED APPLICATIONS

This application is a continuation of U.S. patent application Ser. No. 17/985,865, filed Nov. 13, 2022, entitled "Gaming Machine And Method With Numerical Basis For Prizes In Reels", which is a continuation of U.S. patent application Ser. No. 17/197,436, filed Mar. 10, 2021, entitled "Gaming Machine And Method With Numerical Basis For Prizes In Reels" which is a continuation of U.S. patent application Ser. No. 16/265,010, filed Feb. 1, 2019, of the same title, now U.S. Pat. No. 10,950,083. The Applicant hereby claims the benefit of each of these non-provisional patent applications under 35 U.S.C. § 120. The entire content of each of these non-provisional patent applications is incorporated herein by this reference.

FIELD OF THE INVENTION

This invention relates to gaming systems and to gaming machines through which players may participate in games and in particular to reel based games in which results are shown through symbols appearing on the reels.

BACKGROUND

Many different types of gaming machines have been developed to provide various formats and graphic presentations for conducting games and presenting game results. For example, numerous mechanical reel-type gaming machines, also known as slot machines, have been developed with different reel configurations, reel symbols, and paylines. More recently, gaming machines have been developed with video monitors that are used to produce simulations of mechanical spinning reels. These video-based gaming machines may use one or more video monitors to provide a wide variety of graphic effects in addition to simulated spinning reels and may also provide secondary/bonus games using different reel arrangements or entirely different graphics. Many video-based gaming machines have three or five spinning reels that may be stopped to display a matrix of game symbols. The symbols displayed on the stopped reels correlate to a result of the game. Video-based gaming machines may also be used to show card games or various types of competitions such as simulated horse races in which wagers may be placed.

Game manufacturers are continuously pressed to develop new game presentations, formats, and game graphics in an attempt to provide high entertainment value for players and thereby attract and keep players. What is needed are ways to provide both anticipation and excitement to players while providing more variability in game results, that is, more variability in the manner in which game results are displayed.

SUMMARY OF THE INVENTION

The present invention includes wagering games, gaming machines, and networked gaming systems that provide improvements to games played on slot machines or other gaming machines. A gaming machine and method for operating a gaming machine game are provided in which virtual or mechanical reels include numbers from which a prize amount is produced by concatenation. In response to an activation by a player, the reels display conduct of a game including spinning a plurality of reels having a plurality of symbol locations including game symbols located on the reels while spinning and after stopping to display a game result. The game symbols including single digit numbers including "0" and at least one positive number, double digit numbers including "00" and at least one positive number, and one or more blank symbol with no number. A prize amount associated with the combination of the game symbols in the base game outcome is identified by concatenating the single digit numbers and double digit numbers. The prize amount is awarded to the player.

According to a first aspect of the invention, a gaming machine includes a display system, a player input device, and at least one electronic processor operatively coupled to the display system and the player input device and configured to execute instructions related to a game. The display system displays a plurality of physical or video simulated reels with each reel defining a plurality of symbol locations and each symbol location containing a game symbol. The game symbols contained in the various symbol locations are included in a game symbol set including a non-numerical symbol and numerical symbols including single digit numbers including "O" and double digit numbers including "00." The at least one electronic processor is operable to, after an input from the player input device, cause the display system to show at least two of the plurality of reels spin and then come to a stop at least once to display either a winning result or a losing result. Where the result displayed is a winning result, the stopped reels display a numerical value defined by concatenating the numerical symbols from the game symbol set aligned along a payline. The displayed amount may be awarded as a bonus prize.

Some implementations of a gaming machine in accordance with this first aspect of the invention may employ a game symbol set made up of positive single digit numbers including "0," positive double digit numbers including "00," and a single non-numerical symbol comprising a blank symbol.

In some embodiments the mechanical reel display is a three-reel display showing a single symbol location from each reel. The single symbol locations of the different reels in these embodiments align along the payline along which the numerical value for a winning result is displayed.

The electronic processor may be further programmed to provide a mystery bonus feature by respinning the reels to display a second outcome comprising a second prize amount defined by concatenating the single digit and double digit numbers aligned along the payline and ignoring the non-numerical symbols aligned along the payline.

Where a blank symbol is aligned along the payline after the reels are stopped for a given activation of the display device, the electronic processor may also be operable to cause the display system to dim illumination of the blank symbol.

In some embodiments, the electronic processor is further programmed to select outcome sequences for the game by performing a prize amount random selection and generating a first random number and select a prize amount based on the first random number, generating a second random number and selecting an outcome sequence from a group of outcome sequences providing the prize amount. The group of outcome sequences from which the outcome sequence is selected here may be selected by generating a third random number that is then used to select either a first group of outcome sequences including only base game outcome sequences or a second group outcome sequences including only outcome sequences with a base game outcome and a bonus game outcome.

The display system for gaming machines according to this first aspect of the invention may comprise a video display or a display including mechanical reels.

According to another aspect of the invention, a method is provided for controlling operation of a gaming machine. Under control of a processing system of the gaming machine, the method includes storing a first data structure in a memory of the gaming machine. This first data structure comprises data corresponding to a set of virtual reel strips for a plurality of reels each having a plurality of symbol locations. Each such symbol location contains a respective game symbol included in a game symbol set including a non-numerical symbol, single digit numbers including "0," and double digit numbers including "00." In response to a play input entered through a player input device of the gaming machine and under control of the processing system, the method includes causing a display system of the gaming machine to display at least two of the reels spinning and stopping to display a numerical value defined by concatenating the numerical symbols from the game symbol set aligned along a payline.

In some embodiments, the method further includes, in response to identifying a blank symbol along the designated payline after the reels are stopped, dimming illumination of the blank symbol.

Randomly selecting one of the outcome sequences may further include generating a first random number and select a prize amount based on the first random number, generating a second random number and selecting the outcome sequence from one of the first or second group of outcome sequences providing the prize amount. A third random number may be generated, with the actual outcome sequence used being selected based on the third random number.

Another aspect of the invention is a computer program product stored on a tangible, non-transitory readable medium. The computer program is executable by a processing system or networked gaming system for controlling the operation of a gaming machine to perform the steps of the method discussed above.

Another aspect of the invention is a gaming system that includes one or more gaming servers, and a group of electronic gaming machines connected to the servers by a network, programmed to provide one of more of the methods described herein. The various functionality described herein may be distributed between the electronic gaming machines and the gaming servers in any practically functional way. For example, one architecture is for the servers to determine all aspects of game logic, random number generation, and game outcomes. The gaming machines provide functionality of interfacing with the player and animating the game results to present the results received from the server in an entertaining manner. However, other embodiments of course might use a thin client architecture in which the display system is also controlled by the server and electronic gaming machines serve merely as a terminal to receive button or touchscreen input from the player and to display graphics received from the server.

Different features may be included in different versions of the invention. These and other advantages and features of the invention will be apparent from the following description of the preferred embodiments, considered along with the accompanying drawings.

DETAILED DESCRIPTION OF EXAMPLE EMBODIMENTS

Figure 1:
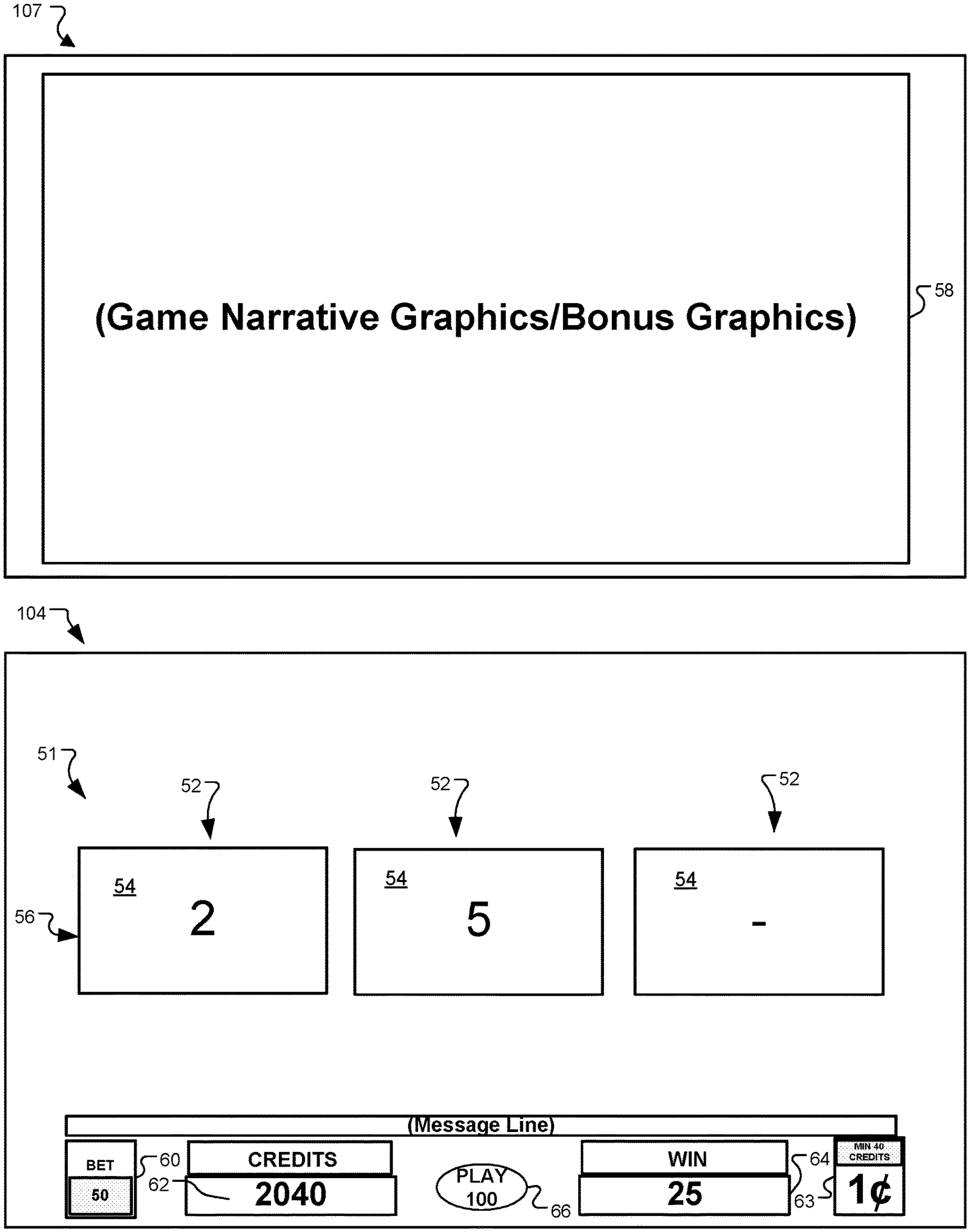
FIG. 1 is a representation of a display system in an example embodiment.

The display system shown in FIG. 1 includes a primary display device 104 and secondary (top) display device 107 to illustrate an example slot machine display arrangement on which game results may be presented in accordance with the present invention. FIG. 1 shows that display device 104 displays a matrix 51 of symbol locations 54, in this version arranged in a single row 56, with three displayed symbol locations 54 which represent simulated slot machine reels 52 that are animated to spin in the conduct a game. Other embodiments may, of course, use other types of game displays to display symbols according to the methods herein. In this instance there are three reels 52 with only one symbol location 54 displayed at a time on each reel, but the techniques herein may be employed with more and less reels. Secondary display 107 includes a display area 58 for game narrative graphics and bonus graphics.

Another embodiment includes a mechanical reel version with three mechanical reels. A single symbol location of each reel is visible in a display area viewed through a window or windows present along the front of a gaming machine cabinet.

Whether simulated reels or mechanical reels are used, each reel typically has far more symbols than those displayed, and as many unique stop positions as there are symbols on the simulated or physical reel. Some variations of the present invention may use a simulated uni-symbol reel in each depicted symbol location 54.

Figure 2:
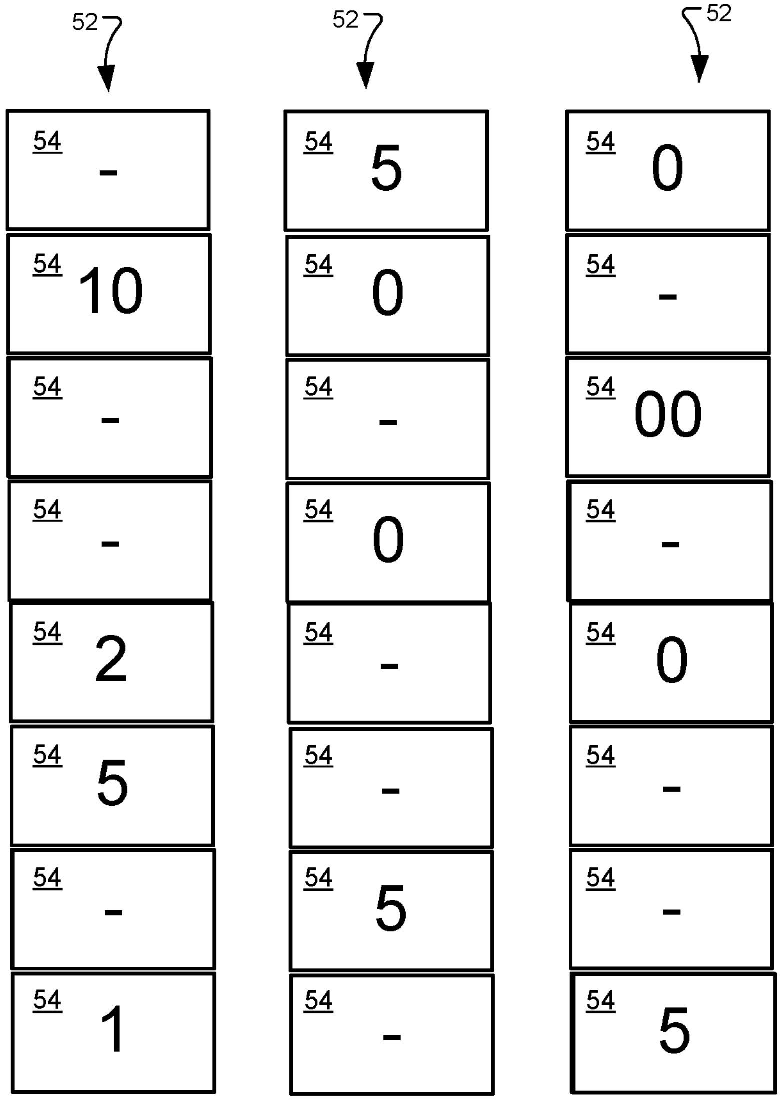
FIG. 2 is a diagram of several reel strips according to an example embodiment.

FIG. 2 shows the game symbols of three reels 52 used according to one preferred embodiment. The depicted reels 52 each include eight symbol locations 54, each corresponding to a stop position of the reel which shows the respective symbol along the row 56 in FIG. 1. As shown, each reel has four blank symbols and four symbols including numbers. The blank symbols can be any graphical symbol or appearance which represents a blank according to the game evaluation set forth below. Both single digit numbers including "O" and double digit numbers including "00" are shown in this example. The example arrangement shown in FIG. 2 defines a game symbol set made up of the single digit numbers 1, 2, 5, and 0, the double digit numbers 10 and 00, and the blank symbol representing a non-numerical symbol and shown as a dash in the illustration.

Referring again to FIG. 1, below matrix 51 is box 60, which displays the current wager amount in this example. If an embodiment of the game uses multiple paylines, a bet per line display may be shown. To the right of box 60 is box 62, which displays the current credits in the player's account. A touchscreen play button 66 is presented in the lower central area of display device 104, which may show other game state related graphics. To the right of play button 66 is a win box 64, which displays the player's last awarded winnings. A wager credit denomination is shown in box 63 in this particular example. Along the bottom edge of the matrix 51 there is a message line, where instructions or information may be presented to the player.

Figure 3:
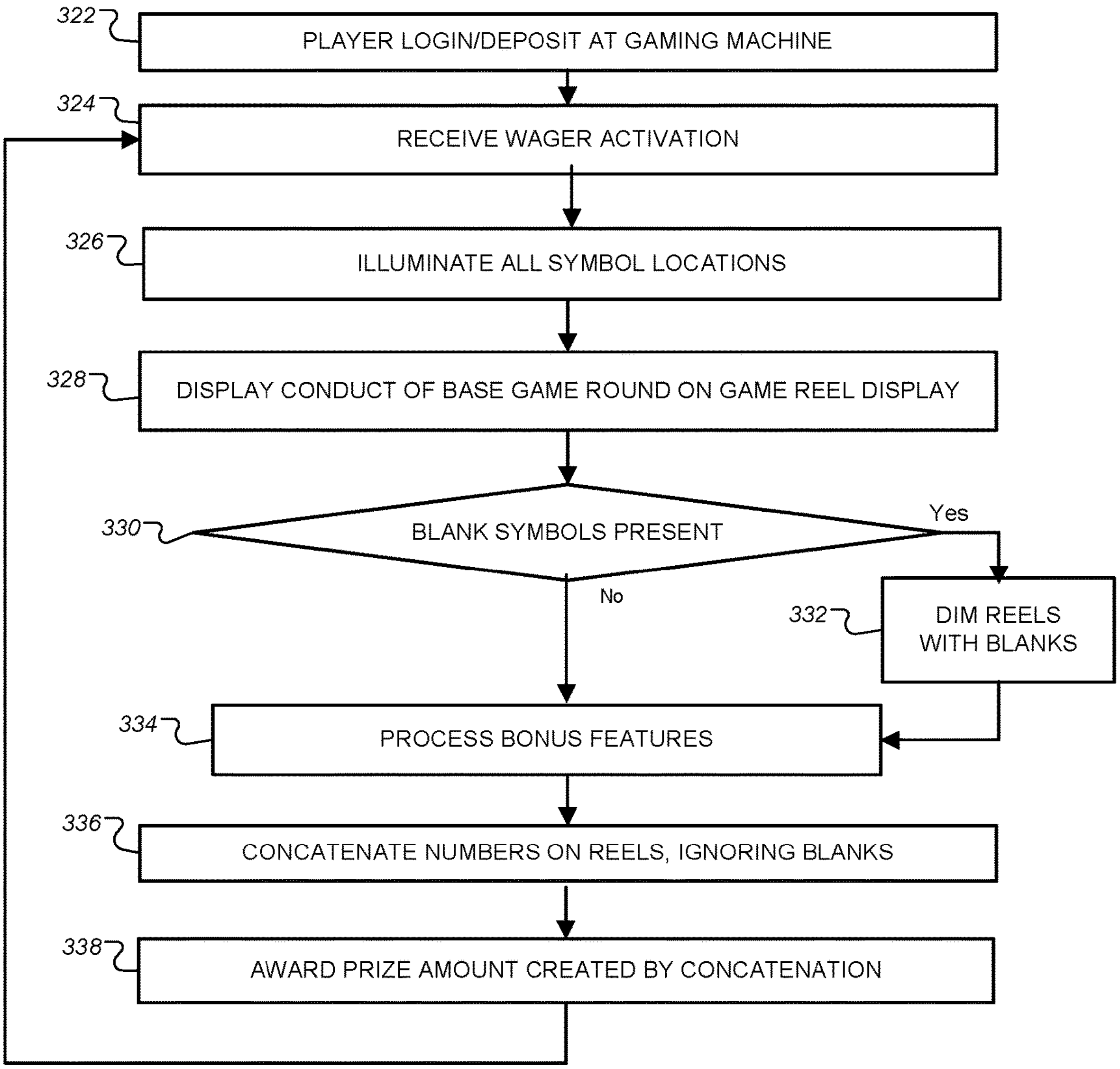
FIG. 3 is a flowchart of a process for providing a game according to an example embodiment.

FIG. 3 is a flowchart showing a process for providing a game according to one or more embodiments of the invention. Generally, the process is conducted under control of one or more electronic processors to present gaming results on one or more displays on a gaming machine such as those described in reference to FIG. 1 and described further below. To initialize the game and make it available for wagering, the example process starts a game engine software package for executing the game.

The process of providing a game for a player starts at block 322 where a player logs in or deposits money or a credit voucher at a gaming machine. This includes receiving the player deposit through a credit input device such as the currency/voucher acceptor 112 (FIG. 6), and in response activating a credit meter value that establishes a player credit balance in this example.

To begin a game play in this example implementation, the method receives a wager activation on a player input device at the gaming machine at block 324, which typically consists of some input from the player to set the amount to be wagered from their credit amount on the machine. The wager amount may also be carried over from previous game rounds by simply starting the game with the previous wager amount set. This typically happens through a 'Play' button (110, FIG. 6) on the game cabinet or touchscreen display and serves to place the wager and start a single round of game play in the base game. The reel symbol locations 54 (FIG. 1) are preferably illuminated during conduct of the round of game play as shown at block 326. In some embodiments, the wager amount may select a number of paylines on which to wager. In the preferred embodiment herein, the wager amount is used to activate reels for spinning in the game. Each bet level corresponds to a number of active reels. For example, a one credit bet will play with the first reel only, with a maximum possible award 4 in this example of 10 credits with the example reel strips shown in FIG. 2. A 5 credit bet plays the first two reels with a maximum possible award of 105 credits with the reel strips shown in FIG. 2. The maximum bet level plays all three reels to provide a maximum possible award of 10,500 credits using the reel strips shown in FIG. 2.

In embodiments having reels, reel displays, or simulated reels, the round of play is conducted by spinning and stopping the reels, as shown at block 328, to display conduct of a base game round on the reel display. Other embodiments may otherwise rearrange or randomize the symbols on the matrix in any suitable manner. For games that use other methods of scrambling the matrix besides simulated reels, the random outcome is determined at this step as appropriate for the game. A true spin of reels may be used to produce the outcome. The preferred version generates at least one random number and uses the at least one random number to determine a set of game reel stops, which is fed to a first data structure for providing the game presentation.

The base game outcome includes a possibility of winning money value credits and a possibility of winning a bonus game feature. The game outcome is evaluated along one or more designated paylines at blocks 336 and 338. Preferably, a single payline over a single row of symbol locations is evaluated. The evaluation does not proceed as a typical slot machine searching for matching symbols along a payline and then comparing the matched symbols to a pay table. Instead, the numerical symbols aligned along the payline are concatenated to directly produce a prize amount. If any blank symbols are present along the payline as shown at block 330, they are ignored and the symbol location containing a blank is preferably dimed to visually communicate this to the player as shown at block 332.

Figure 5:
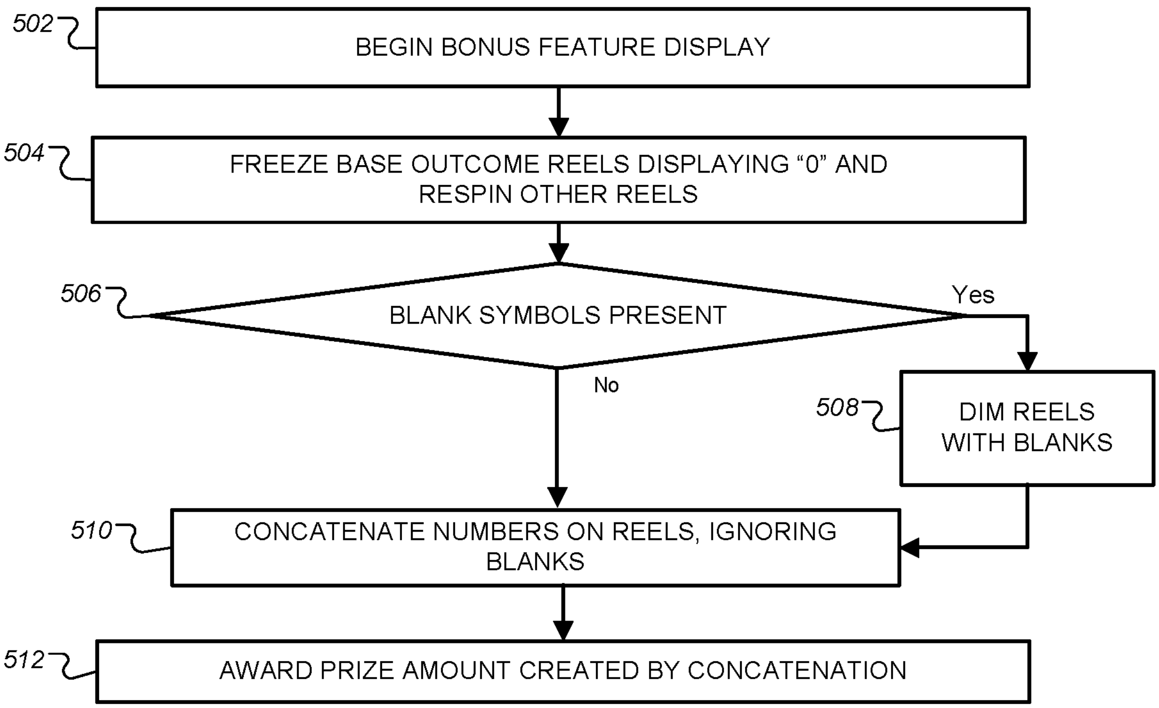
FIG. 5 is a flowchart of a process for providing a bonus game according to an example embodiment.

With the initial display of the reel spin complete, the process at block 334 determines whether a bonus feature is to be performed during the game round. If a bonus feature, such as the partial respin feature of FIG. 5, is to be performed, the process at block 334, performs any bonus features that may occur. If no bonus feature is to be performed, block 334 has no effect. Then at block 336, the process identifies a prize amount from the outcome by concatenating the single and double digit numbers and ignoring the blank symbols along the designated payline. For example, in the outcome depicted in FIG. 1, the blank symbol on the right side is ignored and the "2" and "5" symbols are concatenated in normal left-to-right order to yield a prize of 25 credits. Typically, only a single payline is used to yield a single number. The prize amount is awarded at block 338, by crediting the player's credit account with additional credits resulting from their wager. Then the process returns to block 324 where it waits to receive another wager activation.

Figure 4:
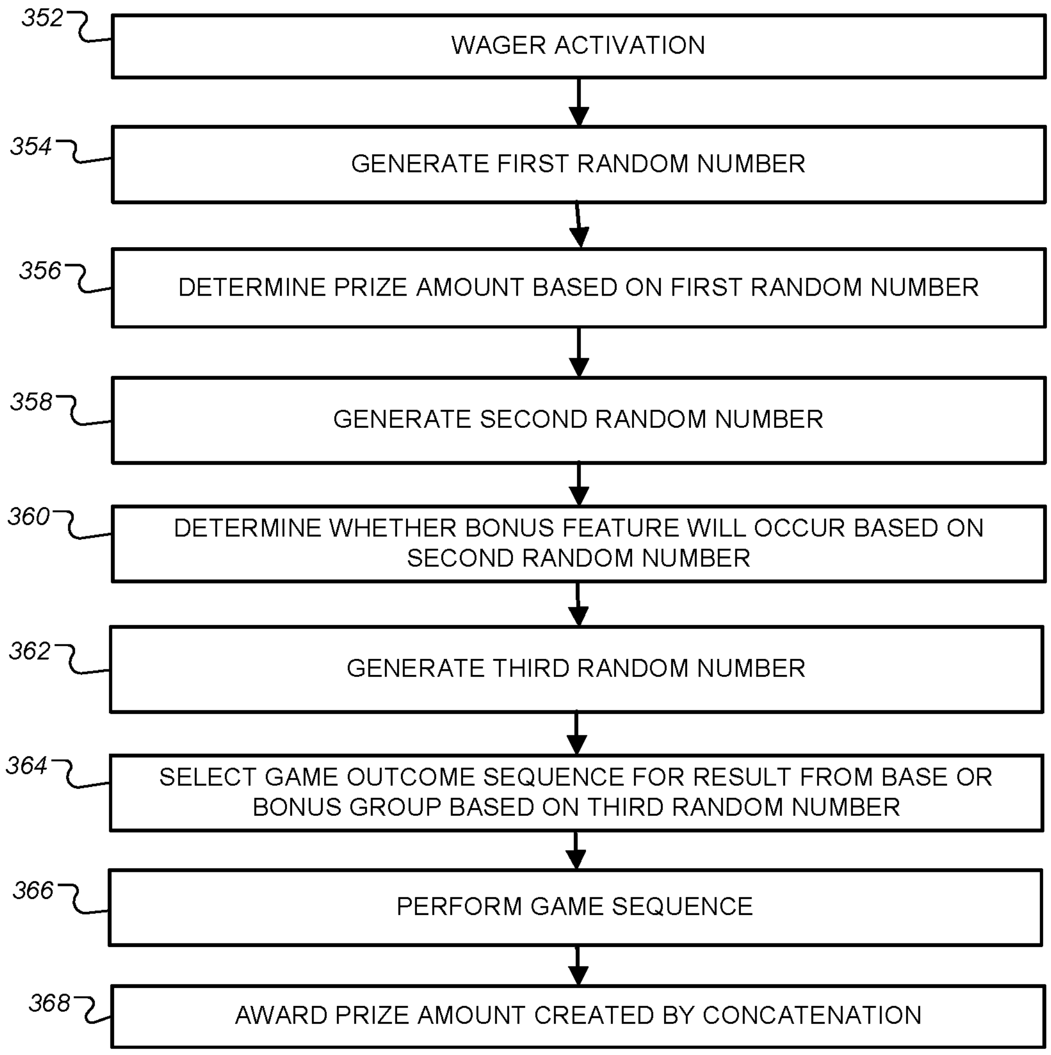
FIG. 4 is a flowchart of a process for providing game outcome sequences according to an example embodiment.

FIG. 4 is a flowchart of a process for producing game outcomes by a game engine according to an example embodiment. This is one example process by which the gaming machines gaming engine can produce gaming results.

Generally, the process uses several data structures which are manipulated to conduct the game, including providing a first data structure stored in a memory of the gaming machine comprising data corresponding to reel strip data 52 (FIG. 2) describing symbol locations for a set of reels each including game symbols. The process also accesses a second data structure 230 (FIG. 7) stored in the memory including a first set of outcome sequence groups. Each of the groups corresponding to a respective prize amount, the set of outcome sequence groups including only base game outcome sequences. Base game outcome sequences include a set of reel stop positions for the reels 52 and a prize amount, and may include further information such as a sequence identifier. A third data structure 232 is also accessed from the memory, including a second set of outcome sequence groups each corresponding to a respective prize amount, the second set of outcome sequence groups including only outcome sequences with a base game outcome and a bonus feature outcome. Bonus game outcome sequences include a set of base game reel stop positions for the reels 52, a base game prize amount, and one or more sets of bonus feature reel stop positions with an associated prize amount for each. The prize amounts are defined by the reel stop positions and may not be a separate data item.

The process of FIG. 4 begins with a wager activation by the player at block 352. To produce a game outcome for the wager, the process at block 354 generates a first random number using a random number generator (RNG) running on the gaming machine or a suitable gaming server connected to the gaming machine over a network like that of FIG. 8. Next, at block 356, the process determines a prize amount for the game outcome based on the first random number. This step represents an outcome random selection and is preferably done with prize table through which designated ranges of the random number value are mapped to designated prize amounts, with the size of the ranges determining the probability of getting a particular prize amount. Prize tables are known in the art and will not be further described.

Next at block 358, the process generates a second random number, and at block 360, based on the second random number, determines whether a bonus feature will occur or the prize amount will be provided only through the base game. This latter step represents an outcome group random selection.

To produce the base or bonus outcome, the process then at block 362 then generates a third random number. At block 364, this third random number is used to select a game outcome sequence from the first set of outcome sequence groups (containing base game outcome sequences) or the second set of outcome sequences groups (containing bonus game outcome sequences). The selection of a particular game outcome sequence here represents an outcome sequence random selection.

Then, at block 366, the process performs the game sequence, presenting the game outcome sequence using the reel display, mechanical or simulated, and if the game outcome sequence includes a bonus feature, performing the bonus feature using the reel display following the base game round. To display the gaming sequence, the process activates the first data structure to cause the game presentation to be displayed by the reel display. The resulting array of symbols is processed as described with regard to FIG. 3, and if a bonus outcome sequence was selected at block 364, the outcome sequence will also include a bonus feature process such as that of FIG. 5. The prize amount associated with the array of symbols is awarded at block 368.

While this example process is shown, other methods may be used to produce outcomes. For example, a true-spin or electronic true-spin may be used in which each reel is stopped at a randomized location and the outcome determined directly from the symbols produced.

FIG. 5 is a flowchart of a process for displaying a bonus feature following a base game round according to one embodiment. At block 502, the process begins a bonus feature display. This step is typically reached by the game engine processing a bonus game outcome sequence as described above, with the bonus feature display conducted immediately following the base game outcome display and including at least one respin of the reels to the additional stop positions contained in the bonus feature outcome sequence. At block 504, the process freezes reels 52 that, in the base game round, contained a "0" symbol along the payline. Other embodiments may freeze other symbols such as a "00." According to one embodiment, any time a "0" symbol appears a bonus feature is enabled providing such a respin. In other bonus feature embodiments, a mystery respin may be used in which no particular symbol or combination is seen to cause the respin feature to be activated. Block 504 displays a re-spin of the other, unfrozen, reels 52 and stops at the reel stop positions contained in the bonus feature outcome sequence. Similarly to the base game display, at block 506 the blank symbols may be ignored, with the lighting dimmed or the blank symbol of a simulated reel blank symbol dimmed at block 508. Then at block 510, the process concatenates the numbers on the reels, ignoring blank symbols, to produce a prize amount. At block 512, the prize amount is awarded to the player. In some embodiments, a bonus feature may include multiple respins, and therefore repeat the depicted process. For embodiments that employ the outcome generation process of FIG. 4, the total prize amount awarded in the base round and bonus features equals the prize amount determined at block 356.

Another bonus feature in a preferred embodiment is triggered randomly at block (FIG. 3) after certain winning spins. In this variation, before the prize is awarded for the spin result, reels holding a number are frozen at block 504, and any active reels that show a blank on the payline may respin one time to reveal an award that is greater than the initial spin. Only the concatenated value shown after the respin is awarded.

Referring to FIGS. 3, 4, and 5, the process functionality is controlled by the system processor by executing program code such as game program code 204 (FIG. 7), executable by a gaming machine or gaming network processor, to accomplish the functionality as described herein. It should be understood that this is only one example embodiment, and other versions may divide the processing tasks of the game method in a different manner. For example, some systems may employ a thin client architecture in which practically all of the processing tasks are performed at the game server, and only display information for the player interface transmitted to the electronic gaming machine. In such an embodiment, only the steps involving player input or display are performed by the electronic gaming machine, with the remaining steps performed by one of the game servers in the system. In such a case, though, the software architecture is preferably designed as a thin client in which a dedicated virtual machine running on the game server (or a virtual machine server connected in the gaming network) performs the tasks designated in the present drawing as occurring "at the gaming machine." In the depicted flowcharts, the method is performed by the respective computer hardware operating under control of computer program code. While central processor arrangements may vary (for example award processors may be integrated on the same machine with a gaming server or may be a separate server connected on a secure network), the particular central determinant architecture is not limiting and will be referred to generally in as the game server. To complete the base game and bonus features of FIG. 3 and FIG. 5, the thin client version of the process, performed at the game server, further includes receiving game play requests originating from electronic gaming machine 100, and sending commands to the gaming machine to show reels spinning, the graphical accumulation object, the bonus round selection process, and results being displayed. The division of game logic steps between gaming machines and servers is known in the art and may be accomplished according to suitable methods allowed for the relevant gaming jurisdictions.

Figure 6:
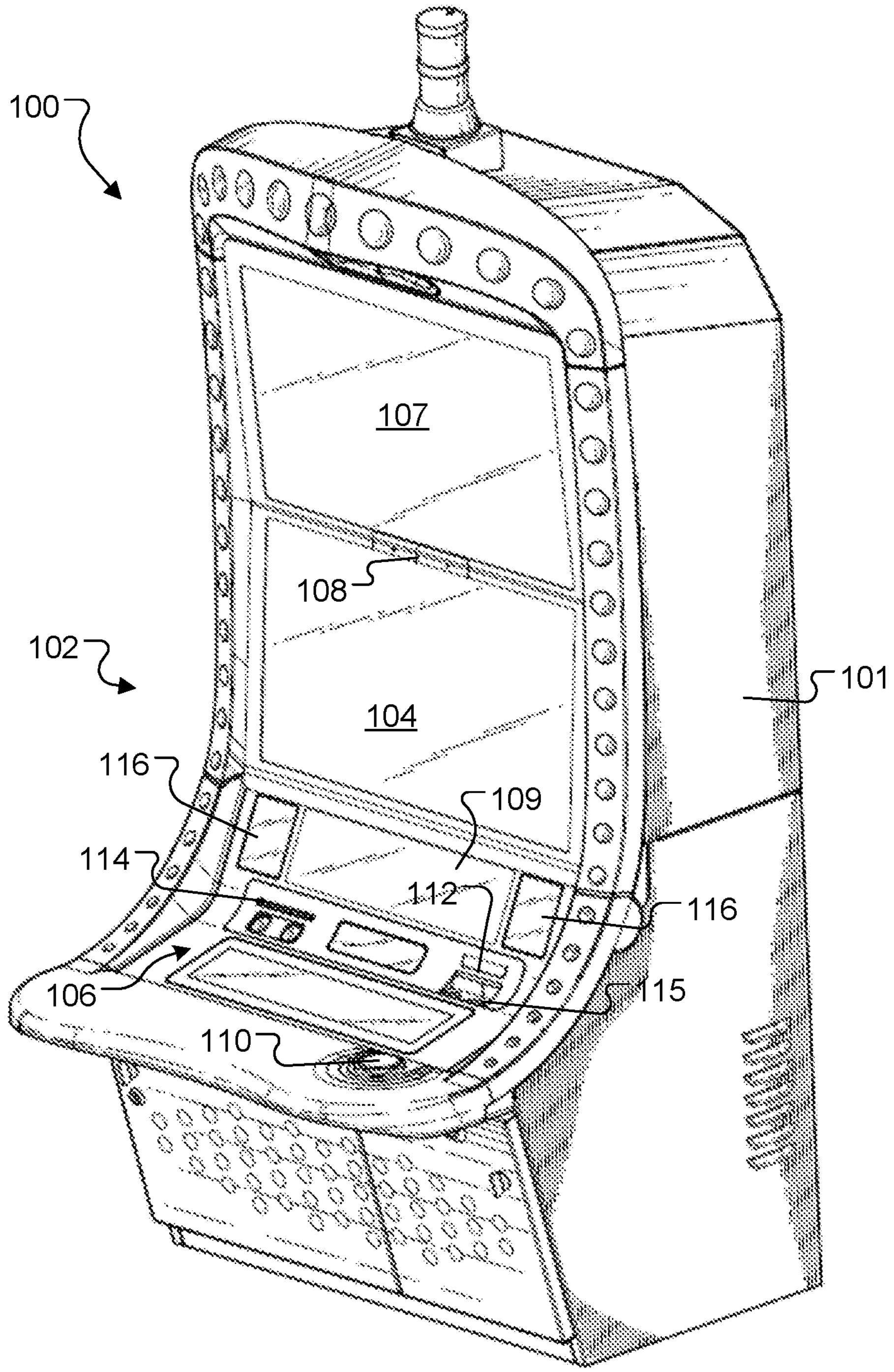
FIG. 6 is a front perspective view of a gaming machine that may be used in a gaming system of the present invention.
Figure 7:
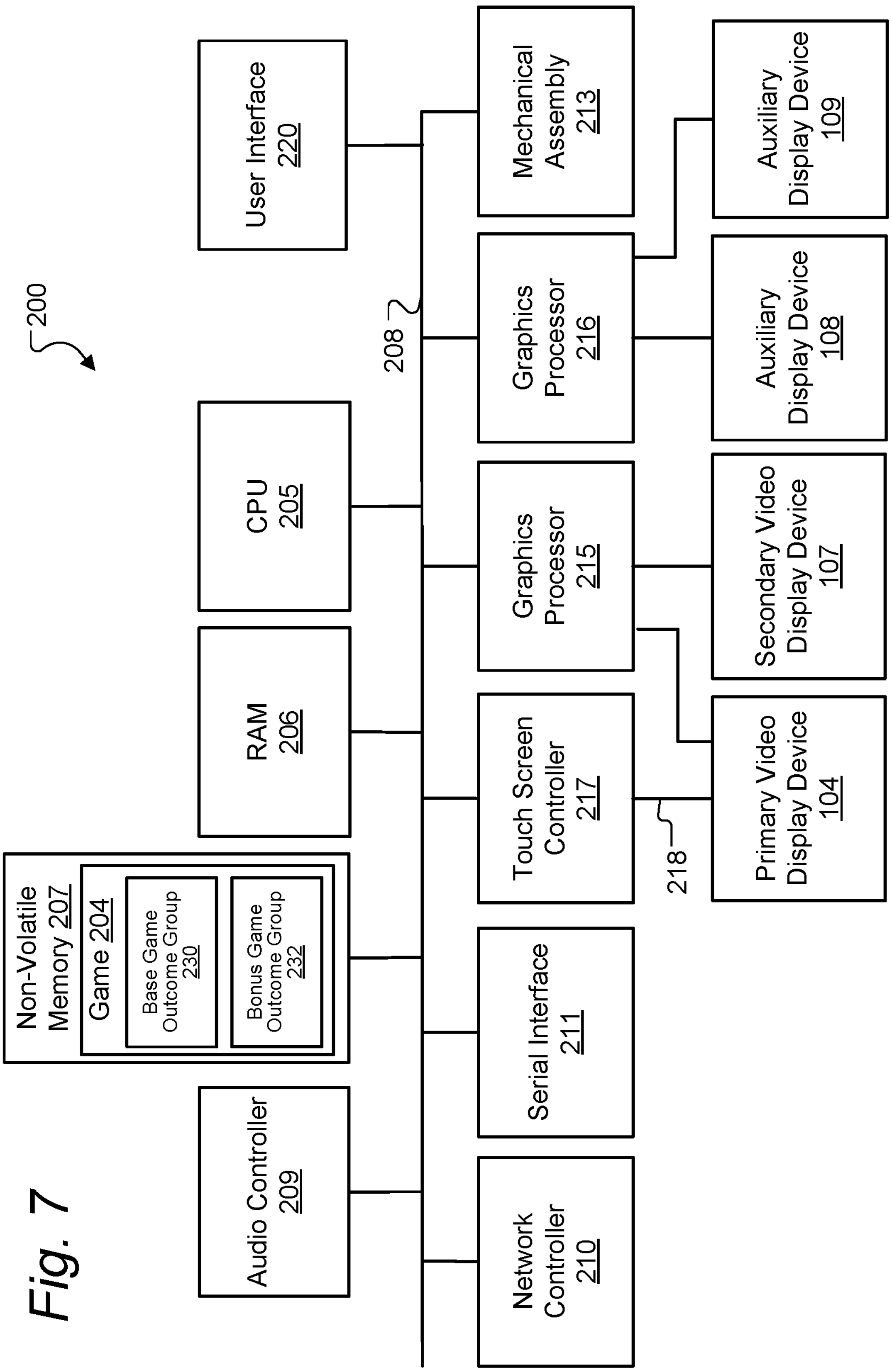
FIG. 7 is a block diagram showing various electronic components of the gaming machine shown in FIG. 5 together with additional gaming system components.

FIG. 6 shows a gaming machine 100 that may be used to implement games according to the present invention. The block diagram of FIG. 7 shows further details of gaming machine 100. Referring to FIG. 6, gaming machine 100 includes a cabinet 101 having a front side generally shown at reference numeral 102. A primary video display device 104 is mounted in a central portion of the front surface 102, with a ledge 106 positioned below the primary video display device and projecting forwardly from the plane of the primary video display device. In addition to primary video display device 104, the illustrated gaming machine 100 includes a secondary video display device 107 positioned above the primary video display device. Gaming machine 100 also includes two additional smaller auxiliary display devices, an upper auxiliary display device 108 and a lower auxiliary display device 109. All of the displays may include touchscreen sensors, especially display 109 which may be used to present touchscreen controls for wagering. It should also be noted that each display device referenced herein may include any suitable display device including a cathode ray tube, liquid crystal display, plasma display, LED display, or any other type of display device currently known or that may be developed in the future.

In preferred versions, the gaming machine 100 illustrated in FIG. 6 also includes a mechanical control button 110 mounted on ledge 106. The control button 110 may allow a player to start a play in a game. Other control buttons not shown in the example gaming machine on FIG. 6 may allow the player to select a wager level for example. Further, primary video display device 104 in gaming machine 100 provides a convenient display device for implementing touchscreen controls.

Gaming machine 100 may also include a number of other player interface devices in addition to devices that are considered player controls for use in playing a particular game. The ledge 106 may also include a hardware special object including a button, touch sensor, or switches, joysticks, or other mechanical input devices, and/or virtual buttons and other controls implemented on a suitable touchscreen video display. Gaming machine 100 also includes a currency/voucher 115 acceptor having an input ramp, a player card reader having a player card input 114, and a voucher/receipt printer having a voucher/receipt output 112. One or more of these devices provides a credit input device in communication with the processor and adapted for accepting a physical item associated with a monetary value that establishes a player credit balance. Audio speakers 116 generate an audio output to enhance the user's playing experience.

FIG. 7 shows a logical and hardware block diagram 200 of gaming machine 100 which includes a central processing unit (CPU) 205 along with random access memory 206 and nonvolatile memory or storage device 207. Storage device 207 is a tangible, nontransitory (nonvolatile) memory holding the program code 204 for presenting the game results as described herein, including a base game data structures 230 containing the data structures associated with the base game round as described above, and bonus game data structures 232 containing the data structures for implementing the bonus game. All of these devices are connected on a system bus 208 with an audio controller 209, a network controller 210, and a serial interface 211. A graphics processor 215 is also connected on bus 208 and is connected to drive primary video display device 104 and secondary video display device 107 (both mounted on cabinet 101 as shown in FIG. 5). A second graphics processor 216 is also connected on bus 208 in this example to drive the auxiliary display devices 108 and 109 also shown in FIG. 6. As shown in FIG. 7, gaming machine 100 also includes a touch screen controller 217 connected to system bus 208. Touch screen controller 217 is also connected via signal path 218 to receive signals from a touchscreen element associated with primary video display device 104 and/or a secondary touchscreen input. Auxiliary display device 109 may also include an integrated touchscreen controller. It will be appreciated that the touchscreen element itself typically comprises a thin film that is secured over the display surface of primary video display device 104. The touchscreen element itself is not illustrated or referenced separately in the figures.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

The elements 205, 206, 207, 208, 209, 210, and 211 shown in FIG. 7 are elements commonly associated with a computer system architecture. These elements are preferably mounted on a chassis that is itself mounted in cabinet 101 shown in FIG. 6. Alternatively, the various electronic components may be mounted on one or more circuit boards housed within cabinet 101 without a separate enclosure such as those found in personal computers. Those familiar with data processing systems and the various data processing elements shown in FIG. 7 will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211, which may be a USB controller or a IEEE 1394 controller for example. It will also be appreciated that some of the devices shown in FIG. 7 as being connected directly on system bus 208 may in fact communicate with the other system components through a suitable expansion bus. Audio controller 209, for example, may be connected to the system via a PCI bus. System bus 208 is shown in FIG. 6 merely to indicate that the various components are connected in some fashion for communication with CPU 205 and is not intended to limit the invention to any particular bus architecture. Numerous other variations in the gaming machine internal structure and system may be used without departing from the principles of the present invention.

It will also be appreciated that graphics processors are also commonly a part of modern computer systems. Although separate graphics processor 215 is shown for controlling primary video display device 104 and secondary video display device 107, and graphics processor 216 is shown for controlling both auxiliary display devices 108 and 109, it will be appreciated that CPU 205 may control all of the display devices directly without any intermediate graphics processor. The invention is not limited to any particular arrangement of processing devices for controlling the video display device included with gaming machine 100. Also, a gaming machine implementing the present invention is not limited to any particular number of video display devices or other types of display devices.

In the illustrated gaming machine 100, CPU 205 executes software which ultimately controls the entire gaming machine including the receipt of player inputs and the presentation of the graphic symbols displayed according to the invention through the display devices 104, 107, 108, and 109 associated with the gaming machine. CPU 205 either alone or in combination with graphics processor 215 may perform functions associated with a base game and bonus game that may be available through the gaming machine. CPU 205 also executes software related to communications handled through network controller 210, and software related to various peripheral devices such as those connected to the system through audio controller 209, serial interface 211, and touch screen controller 217. CPU 205 may also execute software to perform accounting functions associated with game play. Random access memory 206 provides memory for use by CPU 205 in executing its various software programs, while the nonvolatile memory or storage device 207 may comprise a hard drive, flash drive, or other mass storage device providing storage for programs not in use or for other data generated or used in the course of gaming machine operation. Nonvolatile memory 207 holds game engine software 204, and the data structures discussed with regard to the processes above including groups of base game outcome 230 and bonus game outcomes 232. These structures are typically initialized into RAM 206 for game execution. Network controller 210 provides an interface to other components of a gaming system in which gaming machine 100 is included.

It should be noted that the invention is not limited to gaming machines employing the computer-type arrangement of processing devices and interfaces shown in example gaming machine 100. Other gaming machines through which the features herein are implemented may include one or more special purpose processing devices to perform the various processing steps for implementing the present invention, such as generating random numbers or checking the security status of software packages or gaming credit vouchers. Unlike general purpose processing devices such as CPU 205, these special purpose processing devices may not employ operational program code to direct the various processing steps.

It should also be noted that the invention is not limited to gaming machines including only video display devices for conveying results. It is possible to implement a game within the scope of the present invention using an electromechanical reel arrangement or even a purely mechanical arrangement for displaying the symbols.

Still referring to the hardware and logical block diagram 200 showing an example design for a gaming machine 100, the depicted machine in operation is controlled generally by CPU 205 which stores operating programs and data in memory 207 with wagering game 204, user interface 220, network controller 210, audio/visual controllers, and reel assembly 213 (if mechanical reel configuration). CPU or game processor 205 may comprise a conventional microprocessor, such as an Intel microprocessor, mounted on a printed circuit board with supporting ports, drivers, memory, software, and firmware to communicate with and control gaming machine operations, such as through the execution of coding stored in memory 207 including one or more wagering games 204. Game processor 205 connects to user interface 220 such that a player may enter input information, and game processor 205 may respond according to its programming, such as to apply a wager and initiate execution of a game. Game processor 205 also may connect through network controller 210 to a gaming network, such as example casino server network 400 shown in FIG. 8.

Figure 8:
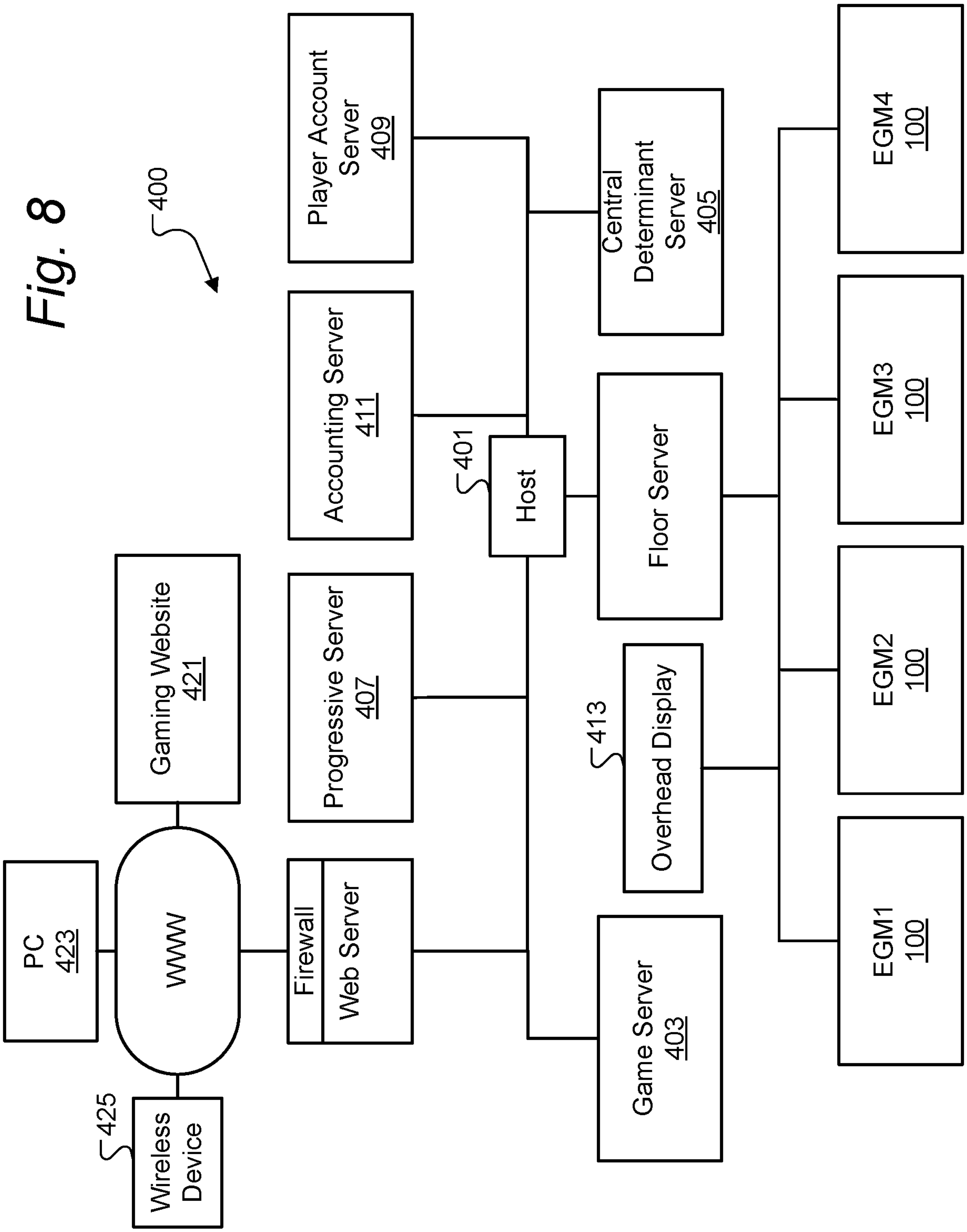
FIG. 8 is a system block diagram of a gaming system according to one embodiment of the present invention.

Referring now to FIG. 8, the casino server network 400 may be implemented over one or more site locations and include host server 401, remote game play server 403 (which may be configured to provide game processor functionality including determining game outcomes and providing audio/visual instructions to a remote gaming device), central determinant server 405 (which may be configured to provide random numbers to gaming processes, or to determine lottery, bingo, or other centrally determined game outcomes and provide the information to networked gaming machines 100 providing lottery and bingo-based wagering games to patrons), progressive server 407 (which may be configured to accumulate a progressive pool from a portion of wagering proceeds or operator marketing funds and to award progressive awards upon the occurrence of a progressive award winning event to one or more networked gaming machines 100), player account server 409 (which may be configured to collect and store player information and/or awards and to provide player information to gaming machines 100 after receiving player identification information such as from a player card), and accounting server 411 (which may be configured to receive and store data from networked gaming machines 100 and to use the data to provide reports and analyses to an operator). Through its network connection, gaming machine 100 may be monitored by an operator through one or more servers such as to assure proper operation, and, data and information may be shared between gaming machine 100 and respective of the servers in the network such as to accumulate or provide player promotional value, to provide server-based games, or to pay server-based awards. As depicted in FIG. 8, a block diagram of an example networked gaming system 400 may be associated with one or more gaming facilities, including one or more networked gaming machines 100 in accordance with various embodiments. While a few servers have been shown separately, they may be combined or split into additional servers having additional capabilities.

As shown, networked gaming machines 100 (EGM1-EGM4) and one or more overhead displays 413 may be network connected and enable the content of one or more displays of gaming machines 100 to be mirrored or replayed on an overhead display, or a graphic and audio sequence is shown for announcing and celebrating that a large value win has occurred, known as "celebration" sequence. For example, the primary display content may be stored by the display controller or game processor 205 and transmitted through network controller 210 to an overhead display controller either substantially simultaneously or at a subsequent time according to either periodic programming executed by game processor 205 or a triggering event, such as a jackpot or large win, at a respective gaming machine 100. In the event that gaming machines 100 have cameras installed, the respective player's video images may be displayed on overhead display 413 along with the content of the player's gaming machine 100 and any associated audio feed.

In one or more embodiments, game server 403 may provide server-based games and/or game services to network connected gaming devices, such as gaming machines 100 (which may be connected by network cable or wirelessly). Progressive server 407 may accumulate progressive awards by receiving defined amounts (such as a percentage of the wagers from eligible gaming devices or by receiving funding from marketing or casino funds) and provide progressive awards to winning gaming devices upon a progressive event, such as a progressive jackpot game outcome or other triggering event such as a random or pseudo-random win determination at a networked gaming device or server (such as to provide a large potential award to players playing the community feature game). Accounting server 411 may receive gaming data from each of the networked gaming devices, perform audit functions, and provide data for analysis programs, such as the IGT Mariposa program bundle.

Player account server 409 may maintain player account records, and store persistent player data such as accumulated player points and/or player preferences (e.g. game personalizing selections or options). For example, the player tracking display may be programmed to display a player menu that may include a choice of personalized gaming selections that may be applied to a gaming machine 100 being played by the player.

In one or more embodiments, the player menu may be programmed to display after a player inserts a player card into the card reader. When the card reader is inserted, an identification may be read from the card and transmitted to player account server 409. In some systems, the player card constitutes a physical object which may be read by the gaming machine 100 to deposit credits to the gaming machine for playing, although typically such credits are provided through currency or credit vouchers. Player account server 409 transmits player information through network controller 210 to user interface 220 for display on the player tracking display. The player tracking display may provide a personalized welcome to the player, the player's current player points, and any additional personalized data. If the player has not previously made a selection, then this information may or may not be displayed. Once the player makes a personalizing selection, the information may be transmitted to game processor 205 for storing and use during the player's game play. Also, the player's selection may be transmitted to player account server 409 where it may be stored in association with the player's account for transmission to the player in future gaming sessions. The player may change selections at any time using the player tracking display (which may be touch sensitive or have player-selectable buttons associated with the various display selections).

In one or more embodiments, a gaming website may be accessible by players, e.g. gaming website 421, whereon one or more games may be displayed as described herein and played by a player such as through the use of personal computer 423 or handheld wireless device 425 (e.g. Apple iphone, Android phone, tablet, phablet, virtual reality device, iPad, etc.). To enter the website, a player may log in with a username (that may be associated with the player's account information stored on player account server 409 or be accessible by a casino operator to obtain player data and provide promotional offers), play various games on the website, make various personalizing selections and save the information, so that during a next gaming session at a casino establishment, the player's playing data and personalized information may be associated with the player's account and accessible at the player's selected gaming machine 100.

Referring generally to the description herein, any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

Further, as described herein, the various features have been provided in the context of various described embodiments, but may be used in other embodiments. The combinations of features described herein should not be interpreted to be limiting, and the features herein may be used in any working combination or sub-combination according to the invention. This description should therefore be interpreted as providing written support, under U.S. patent law and any relevant foreign patent laws, for any working combination or some sub-combination of the features herein.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A gaming machine comprising:

(a) a display system displaying a plurality of physical or video simulated reels, each reel defining a plurality of symbol locations with each symbol location containing a game symbol included in a game symbol set, where the game symbol set includes a non-numerical symbol and numerical symbols including single digit numbers including "0" and double digit numbers including "00";

(b) a player input device; and (c) at least one electronic processor operatively coupled to the display system and the player input device, the at least one electronic processor being operable to, after an input from the player input device, cause the display system to show at least two of the plurality of reels spin and then come to a stop to display a numerical value defined by concatenating the numerical symbols from the game symbol set aligned along a payline, and award a bonus prize of the displayed numerical value.

2. The gaming machine of claim 1 wherein each symbol location of each reel contains a positive single digit number, a positive double digit number, "0," "00," or a non-numerical symbol comprising a blank symbol.

3. The gaming machine of claim 1 wherein the bonus prize is part of a random outcome selected by a true spin of the plurality of reels.

4. The gaming machine of claim 1 wherein the at least one electronic processor is further operable to, in response to the non-numerical symbol being aligned along the payline after the reels are stopped, cause the display system to dim illumination of the non-numerical symbol.

5. The gaming machine of claim 1 wherein the at least one electronic processor is further operable to:

(a) perform a prize amount random selection to identify an outcome prize amount; and (b) perform an outcome sequence random selection to identify an outcome sequence including the bonus prize and a base prize from a group of outcome sequences each providing the identified outcome prize amount.

6. The gaming machine of claim 5 wherein:

(a) the at least one electronic processor is further operable to perform an outcome group random selection to select between a first group of outcome sequences and a second group of outcome sequences to identify a selected group of outcome sequences where the first group of outcome sequences includes only base game outcome sequences and the second group of outcome sequences includes only outcome sequences having a base game outcome and a bonus game outcome; and (b) the group of outcome sequences from which the outcome sequence identified in accordance with the outcome sequence random selection is the group of outcome sequences selected from the outcome group random selection.

7. The gaming machine of claim 1 wherein the at least one electronic processor is further operable to:

(a) cause the display system to show each of the plurality of reels spin and then come to a stop to display a first group of symbols from the game symbol set aligned along the payline, the first group of symbols including "0"; and (b) cause a reel that does not display "0" in the first group of symbols from the game symbol set to respin and then come to a stop to display the numerical value defined by concatenating the numerical symbols from the game symbol set aligned along the payline.

8. A method for controlling operation of a gaming machine, the method including:

(a) under control of a processing system of the gaming machine, storing a first data structure in a memory of the gaming machine, the first data structure comprising data corresponding to a set of reel strips for a plurality of reels each having a plurality of symbol locations, each symbol location containing a game symbol included in a game symbol set including a non-numerical symbol and numerical symbols including single digit numbers including "0" and double digit numbers including "00"; and (b) under control of the processing system of the gaming machine, for an activation of the gaming machine in response to an input entered through a player input device of the gaming machine, causing a display system of the gaming machine to show at least two of the plurality of reels spin and then come to a stop to display a numerical value defined by concatenating the numerical symbols from the game symbol set aligned along a payline, and awarding a bonus prize of the displayed numerical value.

9. The method of claim 8 wherein all of the game symbols in the game symbol set comprise positive single digit numbers, positive double digit numbers, "0," "00," and blank symbols.

10. The method of claim 8 wherein the bonus prize is part of a random outcome selected by a true spin of the plurality of reels.

11. The method of claim 8 further comprising, in response to the non-numerical symbol being aligned along the payline after the reels are stopped and under control of the processing system, causing the display system to dim illumination of the non-numerical symbol.

12. The method of claim 8 wherein a randomly selected game outcome is selected by:

(a) performing a prize amount random selection to identify an outcome prize amount; and (b) performing an outcome sequence random selection to identify an outcome sequence including the bonus prize and a base prize from a group of outcome sequences each providing the identified outcome prize amount.

13. The method of claim 8 further comprising:

(a) storing a second data structure in the memory, the second data structure comprising a first group of outcome sequences each corresponding to a respective prize amount and each including only base game outcome sequences;

(b) storing a third data structure in the memory, the third data structure comprising a second group of outcome sequences each corresponding to a respective prize amount and each including only outcome sequences with a base game outcome and a bonus game outcome; and (c) in response to the input and after identifying an outcome prize amount, randomly selecting an outcome sequence from one of the first group of outcome sequences or the second group of outcome sequences.

14. The method of claim 8 further comprising:

(a) under control of the processing system, causing the display system to show each of the plurality of reels spin and then come to a stop to display a first group of symbols from the game symbol set aligned along the payline, the first group of symbols including "0"; and (b) under control of the processing system, causing a reel that does not display "0" in the first group of symbols from the game symbol set to respin and then come to a stop to display the numerical value defined by concatenating the numerical symbols from the game symbol set aligned along the payline.

15. One or more tangible non-transitory computer readable media holding a program product for controlling operation of a reel-type gaming machine, the program product comprising machine readable instructions executable by a processing system for:

(a) under control of a processing system of the gaming machine, storing a first data structure in a memory of the gaming machine, the first data structure comprising data corresponding to a set of reel strips for a plurality of reels each having a plurality of symbol locations, each symbol location containing a game symbol selected from a game symbol set including a non-numerical symbol and numerical symbols including single digit numbers including "0" and double digit numbers including "00"; and (b) under control of the processing system of the gaming machine, for an activation of the gaming machine in response to an input entered through a player input device of the gaming machine, causing a display system of the gaming machine to show at least two of the plurality of reels spin and then come to a stop to display a numerical value defined by concatenating the numerical symbols from the game symbol set aligned along a payline, the displayed numerical value comprising a bonus prize.

16. The media of claim 15 wherein all of the game symbols in the game symbol set comprise positive single digit numbers, positive double digit numbers, "0," "00," and blank symbols.

17. The media of claim 15 wherein the instructions are further executable for:

(a) performing a prize amount random selection to identify an outcome prize amount for a randomly selected game outcome; and (b) performing an outcome sequence random selection to identify an outcome sequence including the bonus prize and a base prize from a group of outcome sequences each providing the identified outcome prize amount.

18. The media of claim 15 wherein the bonus prize is part of a random outcome selected by a true spin of the plurality of reels.

19. The media of claim 15 wherein the instructions are further executable for:

(a) storing a second data structure in the memory, the second data structure comprising a first group of outcome sequences each corresponding to a respective prize amount and each including only base game outcome sequences;

(b) storing a third data structure in the memory, the third data structure comprising a second group of outcome sequences each corresponding to a respective prize amount and each including only outcome sequences with a base game outcome and a bonus game outcome; and (c) in response to the input and after identifying an outcome prize amount, randomly selecting an outcome sequence from one of the first group of outcome sequences or the second group of outcome sequences.

* * * * *